US010582347B2

United States Patent
Cullinan et al.

(10) Patent No.: US 10,582,347 B2
(45) Date of Patent: Mar. 3, 2020

(54) SMS COMMUNICATION FOR CELLULAR NODE

(71) Applicant: Mueller International, LLC, Atlanta, GA (US)

(72) Inventors: Thomas Cullinan, Sagamore Beach, MA (US); Valentin Mircea Burtea, Toronto (CA); Brent Dukes, Raynham, MA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 15/098,986

(22) Filed: Apr. 14, 2016

(65) Prior Publication Data
US 2017/0303103 A1 Oct. 19, 2017

(51) Int. Cl.
G01D 4/00 (2006.01)
H04M 3/00 (2006.01)
H04W 4/14 (2009.01)
H04W 76/10 (2018.01)

(52) U.S. Cl.
CPC ............... *H04W 4/14* (2013.01); *G01D 4/00* (2013.01); *H04M 3/00* (2013.01); *H04W 76/10* (2018.02)

(58) Field of Classification Search
CPC ..................................................... G01D 4/004
USPC ............................ 455/452.1, 453; 370/310
See application file for complete search history.

(56) References Cited

U.S. PATENT DOCUMENTS

| | | |
|---|---|---|
| 5,252,967 A | 10/1993 | Brennan, Jr. et al. |
| 5,371,734 A | 12/1994 | Fischer |
| 5,438,329 A | 8/1995 | Gastouniotis et al. |
| 5,594,776 A | 1/1997 | Dent |
| 5,666,655 A | 9/1997 | Ishikawa et al. |
| 5,774,733 A | 6/1998 | Nolan et al. |
| 5,787,358 A | 7/1998 | Takahashi |
| 5,892,441 A | 4/1999 | Woolley et al. |
| 5,963,557 A | 10/1999 | Eng |

(Continued)

FOREIGN PATENT DOCUMENTS

| | | |
|---|---|---|
| EP | 2772074 | 8/2018 |
| WO | 2009133237 | 11/2009 |

(Continued)

OTHER PUBLICATIONS

ITRON; Brochure for ChoiceConnect, Copyright 2013, 4 pgs.

(Continued)

*Primary Examiner* — Joshua L Schwartz
(74) *Attorney, Agent, or Firm* — Taylor English Duma LLP

(57) ABSTRACT

Disclosed are technologies for a communication system for a utility infrastructure system. The communication system includes a host configured to aggregate and collect utility data. The communication system also includes a remote, battery-powered node connected to a utility device of the utility infrastructure system. According to some examples, the node is configured to initiate a first communication message to the host via a first type of communication channel. The first type of communication channel is short message service (SMS), and the first communication message includes the utility data. The node is also configured to receive a SMS reply from the host, wherein the SMS reply includes information for communicating with the host via a second type of communication channel.

18 Claims, 5 Drawing Sheets

(56) References Cited

U.S. PATENT DOCUMENTS

| | | | |
|---|---|---|---|
| 6,028,855 A | 2/2000 | Hirsch | |
| 6,031,466 A | 2/2000 | Leshets et al. | |
| 6,405,047 B1 | 6/2002 | Moon | |
| 6,717,926 B1 | 4/2004 | Deboille et al. | |
| 6,900,737 B1* | 5/2005 | Ardalan | H04Q 9/00 340/870.02 |
| 7,123,628 B1 | 10/2006 | Hwang | |
| 7,202,800 B2 | 4/2007 | Choi | |
| 7,272,635 B1 | 9/2007 | Longtin et al. | |
| 7,313,164 B1 | 12/2007 | Wilson et al. | |
| 7,346,030 B2 | 3/2008 | Cornwall | |
| 7,420,942 B2 | 9/2008 | Wang | |
| 7,564,826 B2 | 7/2009 | Sherman et al. | |
| 7,760,703 B2 | 7/2010 | Kubler et al. | |
| 7,830,874 B2 | 11/2010 | Cornwall et al. | |
| 7,843,379 B2 | 11/2010 | Menzer et al. | |
| 7,962,101 B2 | 6/2011 | Vaswani et al. | |
| 8,014,791 B2 | 9/2011 | Guigne et al. | |
| 8,194,636 B1 | 6/2012 | Doherty et al. | |
| 8,300,626 B2 | 10/2012 | Thubert et al. | |
| 8,375,134 B2 | 2/2013 | Herzog et al. | |
| 8,391,177 B2 | 3/2013 | Picard | |
| 8,577,044 B2* | 11/2013 | Raikar | H04L 63/062 380/278 |
| 8,660,134 B2 | 2/2014 | Splitz | |
| 8,797,871 B2 | 8/2014 | Morandin | |
| 8,855,569 B2 | 10/2014 | Splitz | |
| 8,918,091 B1* | 12/2014 | Hoelzle | H04W 4/046 455/418 |
| 8,933,789 B1 | 1/2015 | Fink et al. | |
| 9,179,502 B2 | 11/2015 | Fischer | |
| 9,204,341 B2 | 12/2015 | Su | |
| 9,204,405 B2 | 12/2015 | Hildebrandt et al. | |
| 9,271,231 B2 | 2/2016 | Nucci | |
| 9,408,112 B2 | 8/2016 | Su | |
| 9,565,620 B2 | 2/2017 | Dukes | |
| 9,743,458 B2 | 8/2017 | Jain et al. | |
| 9,756,089 B2 | 9/2017 | Brook | |
| 9,807,793 B2 | 10/2017 | Fischer | |
| 9,854,607 B1 | 12/2017 | Chu et al. | |
| 9,883,548 B2 | 1/2018 | Backholm et al. | |
| 9,961,694 B2 | 5/2018 | Gao et al. | |
| 10,025,960 B1 | 7/2018 | Fink et al. | |
| 10,039,018 B2 | 7/2018 | Splitz et al. | |
| 10,070,403 B2 | 9/2018 | Grady et al. | |
| 10,097,411 B2 | 10/2018 | Splitz et al. | |
| 10,178,617 B2 | 1/2019 | Splitz et al. | |
| 10,200,947 B2 | 2/2019 | Splitz et al. | |
| 10,267,652 B1 | 4/2019 | Magley et al. | |
| 2002/0051546 A1 | 5/2002 | Bizjak | |
| 2002/0159434 A1 | 10/2002 | Gosior et al. | |
| 2005/0078631 A1 | 4/2005 | Cornwall | |
| 2005/0190784 A1 | 9/2005 | Stine | |
| 2005/0249170 A1 | 11/2005 | Salokannel et al. | |
| 2006/0165031 A1 | 7/2006 | Wang et al. | |
| 2006/0187866 A1 | 8/2006 | Werb | |
| 2006/0245440 A1 | 11/2006 | Mizukoshi | |
| 2006/0268746 A1 | 11/2006 | Wijting et al. | |
| 2006/0274673 A1 | 12/2006 | Fleury | |
| 2007/0014269 A1 | 1/2007 | Sherman et al. | |
| 2007/0057812 A1 | 3/2007 | Cornwall | |
| 2007/0091825 A1 | 4/2007 | Budampati et al. | |
| 2007/0250212 A1 | 10/2007 | Halloran et al. | |
| 2007/0286136 A1 | 12/2007 | Rittle et al. | |
| 2007/0293221 A1 | 12/2007 | Hwang et al. | |
| 2008/0043637 A1 | 2/2008 | Rahman | |
| 2008/0086560 A1 | 4/2008 | Monier et al. | |
| 2008/0240078 A1 | 10/2008 | Thubert | |
| 2009/0201169 A1 | 8/2009 | D'Hont et al. | |
| 2009/0268652 A1 | 10/2009 | Kneckt et al. | |
| 2010/0007521 A1 | 1/2010 | Cornwall | |
| 2010/0026517 A1 | 2/2010 | Cumeralto et al. | |
| 2010/0085954 A1 | 4/2010 | Keshavarzian | |
| 2010/0097988 A1 | 4/2010 | Chung | |
| 2010/0195552 A1 | 8/2010 | Ho | |
| 2010/0329232 A1 | 12/2010 | Tubb et al. | |
| 2011/0018762 A1 | 1/2011 | Walley et al. | |
| 2011/0066297 A1 | 3/2011 | Saberi | |
| 2011/0140909 A1 | 6/2011 | Olson et al. | |
| 2011/0152970 A1 | 6/2011 | Jollota | |
| 2011/0317019 A1 | 12/2011 | Bahl et al. | |
| 2012/0008536 A1 | 1/2012 | Tervahauta et al. | |
| 2012/0026007 A1* | 2/2012 | Beattie | G01D 4/002 340/870.02 |
| 2012/0115518 A1 | 5/2012 | Zeira | |
| 2012/0140622 A1 | 6/2012 | Kruglick | |
| 2012/0201231 A1 | 8/2012 | Omeni | |
| 2013/0007231 A1* | 1/2013 | Forssell | H04L 41/082 709/221 |
| 2013/0064159 A1 | 3/2013 | Edwards | |
| 2013/0083722 A1 | 4/2013 | Bhargava et al. | |
| 2013/0094537 A1 | 4/2013 | Hui et al. | |
| 2013/0107772 A1 | 5/2013 | Splitz et al. | |
| 2013/0107999 A1 | 5/2013 | Mainaud et al. | |
| 2013/0109319 A1 | 5/2013 | Splitz et al. | |
| 2013/0155925 A1 | 6/2013 | Priyantha et al. | |
| 2013/0181848 A1 | 7/2013 | Picard | |
| 2013/0285855 A1 | 10/2013 | Dupray et al. | |
| 2013/0336245 A1 | 12/2013 | Fischer | |
| 2014/0028469 A1 | 1/2014 | Ali | |
| 2014/0028470 A1 | 1/2014 | Ali | |
| 2014/0044005 A1 | 2/2014 | Keys et al. | |
| 2014/0086124 A1 | 3/2014 | Knowles | |
| 2014/0120962 A1 | 5/2014 | Merlin | |
| 2014/0314003 A1 | 10/2014 | Zhou | |
| 2014/0329498 A1 | 11/2014 | Cherian et al. | |
| 2015/0003227 A1 | 1/2015 | Splitz | |
| 2015/0006633 A1 | 1/2015 | Vandwalle et al. | |
| 2015/0081814 A1* | 3/2015 | Turakhia | H04L 12/1822 709/206 |
| 2015/0103818 A1 | 4/2015 | Kuhn | |
| 2015/0124698 A1 | 5/2015 | Jain et al. | |
| 2015/0223168 A1 | 8/2015 | Bhanage et al. | |
| 2015/0257041 A1 | 9/2015 | Su | |
| 2015/0382283 A1 | 12/2015 | Wang et al. | |
| 2016/0050689 A1 | 2/2016 | Fischer | |
| 2016/0066249 A1 | 3/2016 | Dukes | |
| 2016/0080980 A1 | 3/2016 | Su | |
| 2016/0192381 A1 | 6/2016 | Gao et al. | |
| 2016/0218833 A1 | 7/2016 | Sapio et al. | |
| 2016/0249378 A1 | 8/2016 | Zhou | |
| 2016/0269971 A1 | 9/2016 | Kim et al. | |
| 2016/0292469 A1 | 10/2016 | Ianni et al. | |
| 2016/0373940 A1 | 12/2016 | Splitz | |
| 2017/0048659 A1 | 2/2017 | Silvestri | |
| 2017/0164307 A1 | 6/2017 | Zuniga et al. | |
| 2017/0265153 A1 | 9/2017 | Grady et al. | |
| 2017/0280450 A1 | 9/2017 | Jeong et al. | |
| 2017/0339016 A1 | 11/2017 | Splitz | |
| 2018/0014248 A1 | 1/2018 | Splitz | |
| 2018/0220354 A1 | 8/2018 | Heil | |
| 2018/0310265 A1 | 10/2018 | Grady et al. | |
| 2018/0317169 A1 | 11/2018 | Splitz et al. | |
| 2019/0014393 A1 | 1/2019 | Splitz et al. | |
| 2019/0059116 A1 | 2/2019 | Crohas | |
| 2019/0110249 A1 | 4/2019 | Splitz | |
| 2019/0226873 A1 | 7/2019 | Magley et al. | |

FOREIGN PATENT DOCUMENTS

| | | |
|---|---|---|
| WO | 2013062571 | 5/2013 |
| WO | 2013062613 | 5/2013 |
| WO | 2016036475 | 3/2016 |
| WO | 2018203922 | 11/2018 |

OTHER PUBLICATIONS

ITRON; Brochure for Radio Frequency Strategy in an AMI Deployment, Copyright 2012, 5 pgs.

Godwin, Angela; Article entitled: "Advanced Metering Infrastructure: Drivers and Benefits in the Water Industry", Waterworld, accessed on Mar. 30, 2016, 7 pgs.

(56) References Cited

OTHER PUBLICATIONS

Splitz, David Edwin; Final Office Action for U.S. Appl. No. 14/490,081, filed Sep. 18, 2014, dated Jan. 11, 2017; 23 pgs.
Splitz, David Edwin; Non-Final Office Action for U.S. Appl. No. 14/490,081, filed Sep. 18, 2014; dated Sep. 29, 2016; 34 pgs.
Dukes, Brent.; Issue Notification for U.S. Appl. No. 14/475,050, filed Sep. 2, 2014, dated Jan. 18, 2017, 1 pg.
Dukes, Brent; Notice of Allowability for U.S. Appl. No. 14/475,050, filed Sep. 2, 2014, dated Nov. 21, 2016, 33 pgs.
Dukes, Brent; Notice of Allowability for U.S. Appl. No. 14/475,050, filed Sep. 2, 2014, dated Dec. 15, 2016, 6 pgs.
Dukes, Brent; Notice of Allowance for U.S. Appl. No. 14/475,050, filed Sep. 2, 2014, dated Oct. 21, 2016, 15 pgs.
Dukes, Brent; International Preliminary Report on Patentability for PCT application No. PCT/US15/44140, filed Aug. 7, 2015, dated Mar. 16, 2017, 12 pgs.
Splitz, David Edwin; Issue Notification for U.S. Appl. No. 13/283,526, filed Oct. 27, 2011, dated Feb. 5, 2014, 1 pg.
Splitz, David Edwin; Non-Final Office Action for U.S. Appl. No. 13/283,526, filed Oct. 27, 2011, dated Jun. 18, 2013, 67 pgs.
Splitz, David Edwin; Notice of Allowance for U.S. Appl. No. 13/283,526, filed Oct. 27, 2011, dated Oct. 9, 2013, 16 pgs.
Splitz, David Edwin; Issue Notification for U.S. Appl. No. 13/339,655, filed Dec. 29, 2011, dated Sep. 17, 2014, 1 pg.
Splitz, David Edwin; Non-Final Office Action for U.S. Appl. No. 13/339,655, filed Dec. 29, 2011, dated Mar. 5, 2014, 18 pgs.
Splitz, David Edwin; Non-Final Office Action for U.S. Appl. No. 13/339,655, filed Dec. 29, 2011, dated Sep. 16, 2013, 57 pgs.
Splitz, David Edwin; Notice of Allowance for U.S. Appl. No. 13/339,655, filed Dec. 29, 2011, dated May 23, 2014, 41 pgs.
Dukes, Brent; Non-Final Office Action for U.S. Appl. No. 14/475,050, filed Sep. 2, 2014, dated May 19, 2016, 119 pgs.
Grady, Robert Henry; U.S. Patent Application entitled: Time Beacons having U.S. Appl. No. 15/065,423, filed Mar. 9, 2016.
Splitz, David; International Preliminary Report on Patentability for serial No. PCT/US11/58260, filed Oct. 28, 2011, dated May 8, 2014, 7 pgs.
Splitz, David; International Search Report and Written Opinion for serial No. PCT/US11/58260, filed Oct. 28, 2011, dated Feb. 7, 2012, 8 pgs.
Splitz, David; International Preliminary Report on Patentability for serial No. PCT/US12/22060, filed Jan. 20, 2012, dated May 8, 2014, 6 pgs.
Splitz, David; International Search Report and Written Opinion for serial No. PCT/US12/22060, filed Jan. 20, 2012, dated Mar. 29, 2012, 8 pgs.
Splitz, David Edwin; Extended European Search Report for serial No. 12844451.0, filed Jan. 20, 2012, dated Apr. 21, 2015, 8 pgs.
Dukes, Brent; International Search Report and Written Opinion for application No. PCT/US15/44140, filed Aug. 7, 2015, dated Dec. 30, 2015, 15 pgs.
Splitz, David Edwin; U.S. Provisional Patent Application entitled: Automatic Discovery of Nodes in a Mesh Network, U.S. Appl. No. 61/779,896, filed Mar. 13, 2013.
Splitz, David Edwin; U.S. Patent Application entitled: Asymmetrical Hail Timing, having U.S. Appl. No. 15/206,851, filed Jul. 11, 2016, 33 pgs.
Splitz, David Edwin; U.S. Patent Application entitled: Node Migration, having U.S. Appl. No. 15/161,448, filed May 23, 2016.
Grady, Robert Henry; Non-Final Office Action for U.S. Appl. No. 15/065,423, filed Mar. 9, 2016, dated Nov. 28, 2017, 45 pgs.
Splitz, David Edwin; Office Action for Canadian patent application No. 2,850,059, filed Mar. 25, 2014, dated Oct. 31, 2017, 3 pgs.
Splitz, David Edwin; International Search Report for PCT Application No. PCT/US2017/050393, filed Sep. 7, 2017, dated Jan. 8, 2018, 14 pgs.
Splitz, David Edwin; Non-Final Office Action for U.S. Appl. No. 15/161,448, filed May 23, 2016, dated Sep. 22, 2017, 32 pgs.
Splitz, David Edwin; Office Action for Canadian Patent Application No. 2,861,675, filed Oct. 28, 2011, dated Aug. 22, 2017, 4 pgs.
Splitz, David Edwin; Notice of Allowance for U.S. Appl. No. 14/490,081, filed Sep. 18, 2014, dated Mar. 2, 2018, 26 pgs.
Grady, Robert Henry; Notice of Allowance for U.S. Appl. No. 15/065,423, filed Mar. 9, 2016, dated Apr. 12, 2018, 15 pgs.
Splitz, David Edwin; Non-Final Office Action for U.S. Appl. No. 15/206,851, filed Jul. 11, 2016, dated Feb. 7, 2018, 53 pgs.
Splitz, David Edwin; Final Office Action for U.S. Appl. No. 15/161,448, filed May 23, 2016, dated Mar. 15, 2018, 16 pgs.
Splitz, David Edwin; Non-Final Office Action for U.S. Appl. No. 15/583,263, filed May 1, 2017, dated Mar. 8, 2018, 51 pgs.
Splitz, David Edwin; Issue Notification for U.S. Appl. No. 14/490,081, filed Sep. 19, 2014, dated Jul. 11, 2018, 1 pg.
Grady, Robert Henry; Corrected Notice of Allowance for U.S. Appl. No. 15/065,423, filed Mar. 9, 2016, dated Aug. 9, 2018, 6 pgs.
Grady, Robert Henry; Issue Notification for U.S. Appl. No. 15/065,423, filed Mar. 9, 2016, dated Aug. 21, 2018, 1 pg.
Berg et al., Spread Spectrum in Mobile Communication, 1998, The Institution of Electrical Engineers, ISBN 085296935X, pp. 42-132 (Year: 1998).
Splitz, David Edwin; Final Office Action for U.S. Appl. No. 15/206,851, filed Jul. 11, 2016, dated Jul. 20, 2018, 25 pgs.
Splitz, David Edwin; Response to Amendment under Rule 312 for U.S. Appl. No. 15/161,448, filed May 23, 2016, dated Sep. 11, 2018, 6 pgs.
Splitz, David Edwin; Notice of Allowance for U.S. Appl. No. 15/583,263, filed May 1, 2017, dated Aug. 30, 2018, 13 pgs.
Splitz, David Edwin; Corrected Notice of Allowability for U.S. Appl. No. 14/490,081, filed Sep. 18, 2014, dated Jun. 26, 2018, 8 pgs.
Splitz, David Edwin; Office Action for Canadian application No. 2,861,675, filed Mar. 25, 2014, dated Apr. 12, 2018, 4 pgs.
Splitz, David Edwin; Office Action for Canadian patent application No. 2,850,059, filed Mar. 25, 2014, dated Apr. 23, 2018, 3 pgs.
Splitz, David Edwin; Notice of Allowance for U.S. Appl. No. 15/161,448, filed May 23, 2016, dated May 23, 2018, 16 pgs.
Splitz, David Edwin; Corrected Notice of Allowance for U.S. Appl. No. 15/206,851, filed Jul. 11, 2016, dated Oct. 17, 2018, 13 pgs.
Splitz, David Edwin; Notice of Allowance for U.S. Appl. No. 15/206,851, filed Jul. 11, 2016, dated Sep. 20, 2018, 9 pgs.
Splitz, David Edwin; Issue Notification for U.S. Appl. No. 15/161,448, filed May 23, 2016, dated Sep. 19, 2018, 1 pg.
Magley, Dale McLeod; Non-Final Office Action for U.S. Appl. No. 15/877,548, filed Jan. 23, 2018, dated Sep. 17, 2018, 35 pgs.
Magley, Dale McLeod; Notice of Allowance for U.S. Appl. No. 15/877,548, filed Jan. 23, 2018, dated Dec. 10, 2018, 10 pgs.
Splitz, David Edwin; Office Action for Canadian patent application No. 2,850,059, filed Mar. 25, 2014, dated Dec. 13, 2018, 4 pgs.
Splitz, David Edwin; Corrected Notice of Allowance for U.S. Appl. No. 15/206,851, filed Jul. 11, 2016, dated Jan. 4, 2019, 9 pgs.
Splitz, David Edwin; Issue Notification for U.S. Appl. No. 15/206,851, filed Jul. 11, 2016, dated Jan. 16, 2019, 1 pg.
Splitz, David Edwin; Issue Notification for U.S. Appl. No. 15/583,263, filed May 1, 2017, dated Dec. 19, 2018, 1 pg.
Magley, Dale McLeod; Supplemental Notice of Allowability for U.S. Appl. No. 15/877,548, filed Jan. 23, 2018, dated Jan. 10, 2019, 7 pgs.
Splitz, David Edwin; Office Action for Canadian application No. 2,861,675, filed Mar. 25, 2014, dated Mar. 5, 2019, 4 pgs.
Magley, Dale McLeod; Issue Notification for U.S. Appl. No. 15/877,548, filed Jan. 23, 2018, dated Apr. 3, 2019, 1 pg.
Magley, Dale McLeod; Supplemental Notice of Allowability for U.S. Appl. No. 15/877,548, filed Jan. 23, 2018, dated Mar. 14, 2019, 6 pgs.
Grady, Robert Henry; Non-Final Office Action for U.S. Appl. No. 16/021,581, filed Jun. 28, 2018, dated Jul. 12, 2019, 50 pgs.
Splitz, David Edwin; Non-Final Office Action for U.S. Appl. No. 16/214,489, filed Dec. 10, 2018, dated Jul. 25, 2019, 56 pgs.
Splitz, David Edwin; Non-Final Office Action for U.S. Appl. No. 16/111,325, filed Aug. 24, 2018, dated Aug. 15, 2019, 45 pgs.
Magley, Dale McLeod; Non-Final Office Action for U.S. Appl. No. 16/149,242, filed Oct. 2, 2018, dated Aug. 7, 2019, 46 pgs.
Grady, Robert Henry; Corrected Notice of Allowance for U.S. Appl. No. 16/021,581, filed Jun. 28, 2018, dated Nov. 12, 2019, 7 pgs.

(56) References Cited

OTHER PUBLICATIONS

Grady, Robert Henry; Notice of Allowance for U.S. Appl. No. 16/021,581, filed Jun. 28, 2018, dated Oct. 3, 2019, 8 pgs.
Splitz, David Edwin; Final Office Action for U.S. Appl. No. 16/214,489, filed Dec. 10, 2018, dated Nov. 5, 2019, 40 pgs.
Splitz, David Edwin; Office Action for Canadian application No. 2,850,059, filed Jan. 20, 2012, dated Nov. 5, 2019, 3 pgs.
Magley, Dale McLeod; Final Office Action for U.S. Appl. No. 16/149,242, filed Oct. 2, 2018, dated Dec. 16, 2019, 38 pgs.
Splitz, David Edwin; International Preliminary Report on Patentability for PCT Application No. PCT/US2017/050393, filed Sep. 7, 2017, dated Nov. 14, 2019, 11 pgs.

* cited by examiner

SMS COMMUNICATION FOR CELLULAR NODE

BACKGROUND

The present disclosure generally relates to communications for nodes of a utility infrastructure system. More particularly, the disclosure generally relates to short message service (SMS) communications for nodes of the utility infrastructure system.

BACKGROUND

Typically, utility meters (e.g., gas meters, water meters, electricity meters, etc.) are read manually by meter readers who are employees or contractors of the various utility providers. Manual meter reading represents a significant cost to a typical utility provider. However, with the advent of wireless technology, including mesh networking, utility providers have sought methods and systems for remote reading of water meters and even the remote control of water supply valves.

Advanced Metering Infrastructure (AMI) or Advanced Metering Management (AMM) are systems that measure, collect and analyze utility data using advanced metering devices such as water meters, gas meters, and electricity meters. In addition to measuring the various utilities, the advanced metering devices are also configured with communication circuitry, enabling the metering devices to transmit and receive data through the AMI network. In a typical configuration, an advanced metering device (e.g., an advanced water meter) measures and collects utility data (e.g., water usage data) at a customer's location. The metering device then uses a connected communication component, referred to herein as a "node," to transmit meter data to a host associated with the utility provider, often in response to the host's request for such information. In this way, the utility providers may remotely "read" customer usage data for billing purposes.

Because of the remote placement nature of the metering devices and associated nodes, it is desirable to maximize a battery life of the metering devices and nodes in order to reduce down time and to reduce the amount of maintenance that must be performed on the metering devices and nodes. Similarly, it is desirable to maximize responsiveness in communications between various the nodes and the host.

It is with respect to these and other considerations that the disclosure made herein is presented.

SUMMARY

Disclosed are technologies for a communication system for a utility infrastructure system. According to some examples, the communication system includes a host configured to aggregate and collect utility data. The communication system includes a remote, battery-powered node connected to a utility device of the utility infrastructure system. According to some examples, the node is configured to initiate a first communication message to the host via a first type of communication channel. The first type of communication channel is short message service (SMS), and the first communication message includes the utility data. The node is also configured to receive a SMS reply from the host, wherein the SMS reply includes information for communicating with the host via a second type of communication channel.

Also disclosed are technologies for communicating utility data within a utility infrastructure system. The proposed method includes initiating, by a node, a first communication message to a host via a first type of communication channel. The first type of communication channel is short message service (SMS). The node is a remote, battery-powered node of the utility infrastructure system according to some examples. The proposed method also includes receiving, by the node, a SMS reply from the host. The SMS reply includes network protocol information for communicating with the host via a second type of communication channel. The proposed method also includes sending, by the node, a second communication message to the host via the second type of communication channel based on the network protocol information in the SMS reply.

Also disclosed is a tangible non-transitory computer readable medium having a set of instructions stored therein that when executed by a processing element cause the processing element to perform and/or control operations including: listening, by a node, for a first communication message from a host via a first type of communication channel during a listening period, wherein the first type of communication channel is short message service (SMS), wherein the first communication message includes network protocol information for communicating with the host via a second type of communication channel, and wherein the node is a remote, battery-powered node of a utility infrastructure system connected to a utility device; and sending, by the node, a second communication message to the host via the second type of communication channel based on the network protocol information in the first communication.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
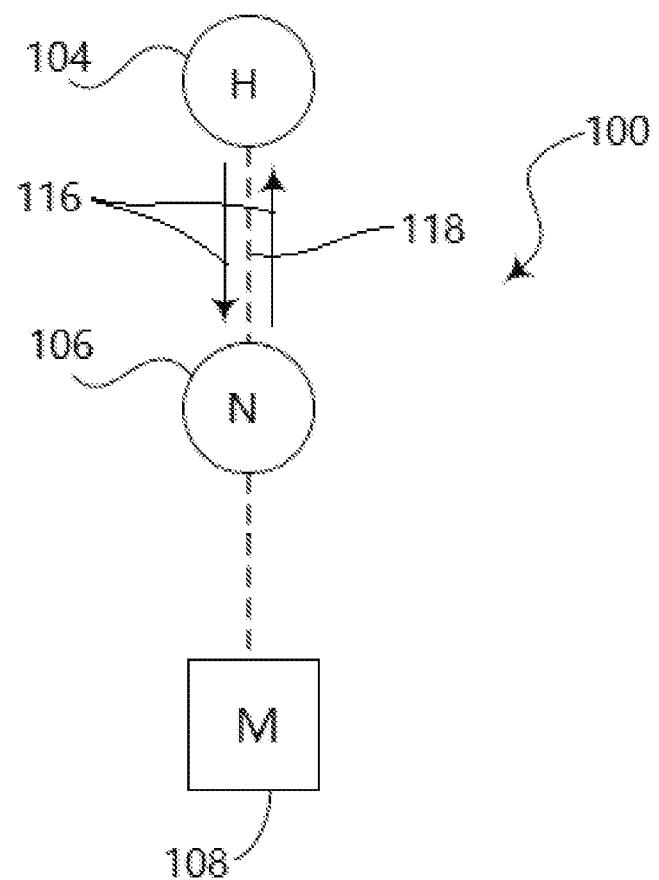
FIG. 1 is a block diagram showing one example of a simplified communications network for a utility infrastructure system.

The present disclosure describes systems and methods for communicating information within a utility infrastructure network. Networks and networking devices may be utilized with Advanced Metering Infrastructure (AMI) systems for measuring utility data at multiple locations and communicating the readings to a utility provider. In response to receiving the utility data, the utility provider can determine billing information for its customers. Utility measurements are performed by various types of meters, such as electric meters, water meters, gas meters, etc. to gather various types of utility data. For example, utility data may include authorized use, unauthorized use, faults, events, leaks, pressure readings, contamination, alerts, and various other types of data related to utility status or conditions. In some networks, the meters are configured to forward their readings via nodes, which are connected communication components, to a host associated with the utility provider.

In addition to transmitting information from the meters to the utility provider, occasionally information may be transmitted from the utility provider to the nodes and to the meters. For example, when the utility provider determines that some or all of the meters or nodes in the network need to be upgraded, firmware upgrade processes may be initiated. Because some meters and/or nodes may be powered by batteries, minimizing the use of the meters and nodes may be desired in order to prolong the life of the batteries. Reducing battery usage time to extend battery life can therefore reduce the amount of maintenance that must be performed on the metering devices.

Generally, there are three steps that metering devices and other nodes complete to establish at least periodic connections to network infrastructure to send data and receive data from the utility provider, from a host within the network, and/or other remote nodes. A first step is to establish a connection to a wireless wide-area network (WWAN), such as a cellular network. A second step is to establish an Internet Protocol (IP) connection on the WWAN. This step refers to connecting the device to the IP layer of the cellular provider. It is also referred to as: connecting the device to the APN (Access Point Name) Gateway of the cellular provider. After this step the device becomes part of the Internet WWAN of the cellular provider. A third step is to establish a bidirectional communication with the host over the WWAN using IP. Communication can then be implemented using a transport protocol of the IP suite, such as Transmission Control Protocol (TCP) or User Datagram Protocol (UDP). However, these current communication implementations waste valuable energy resources to establish the connections because each connection may take between 10-30 seconds to establish the connection. Because the nodes have a limited battery life, and because the connections by the nodes may occur daily or multiple times per day, these current implementations for establishing the connections utilized significant amounts of energy resources, thereby shortening the life of the battery of the nodes.

According to the embodiments described herein, a node may communicate with a host (or other remote node) utilizing Short Message Service (SMS) messages to transmit data. Because SMS messages do not require a either an IP or a TCP/IP connection, the need for the second and third steps outlined above is eliminated, and the amount of time needed to establish the connection between the node and host is reduced, thus reducing the battery power required for the communication. Additionally, for the same amount of energy as needed for current communication implementations, multiple transmissions between the node and host may be established. For example, a node may send SMS messages to the host including various information, such as utility consumption data, an alert (e.g., backflow alert, leak alert), etc. Responsive to receiving the SMS message from the node, the host may send a return SMS message to the node. The return message may include a confirmation of receiving the message from the node.

In another example, a node wakes up and listens for an SMS message from the host. The message may include information, such as node communication configuration information (e.g., what time to send data, what time to read the consumption data, what time to turn on/off an activation device associated with a meter, etc.). The message may also contain a "to do" list of tasks, such as to perform an instant (on demand) read. According to further embodiments, a node may utilize SMS to facilitate the formation of a conventional data connection with the host. For example, the node may wake up and send an SMS message to the host. The host may send a return SMS message that contains IP address information for forming a data connection between the node and the host. The node may then initiate an IP cellular connection and connect to the host using the IP address information. The connection to the host may then be used to transmit firmware updates to the node, to perform service/maintenance on the node, to perform diagnostics on the node, and the like. This arrangement, allowing for the transmission of specific network credentials to a device via SMS for further operation, dispenses with the need to pre-configure communication devices before deployment with information such as network and security credentials.

FIG. 1 is a block diagram of a simplified communications network 100 for a utility infrastructure system. As illustrated, the network 100 includes a host 104 and at least one node 106. The host 104 is associated with a utility provider, such as a gas provider, an electricity provider, or a water provider. The node 106 may be communicatively connected to a utility device 108. In various examples, the node 106 may be in wired or wireless communications with the utility device 108. The utility device 108 may comprise a utility meter such as the water meter represented by the "M" in FIG. 1, but in other examples, the utility device 108 may instead comprise an activation device associated with a separate utility meter. In such an arrangement, the node 106 may be in direct communication with the activation device or may communicate with the activation device via that separate utility meter. The activation device may be an alarm, any type of actuator, or any other type of activation device for the utility. For example, the activation device may any type of actuator, including but not limited to, a tamper prevention device, a locking device, a camera motion device, a fire hydrant nut opening device, or a valve. As previously described, a node 106 may be a connected communication component for the utility device 108. In various examples, the network 100 may include any number of intermediate nodes, such as repeaters, collector hubs, or various other types of nodes, between the host 104 and the nodes 106, and also the number of levels between the host 104 and the nodes 106 may not necessarily be the same for each node 106. The number of hosts 104, nodes 106, or utility devices 108 should not be considered limiting on the current disclosure. For example, in various other examples, the host 104 is in communication with a plurality of utility devices 108 having nodes 106.

The host 104, node 106, and utility device 108 may comprise circuitry and functionality to enable communication between various components. In situations where the communication is wireless, the communication between any of the components may be active during some periods of time and may be inactive during other periods of time. Alternatively, any of the components may be connected together through wired connections. It should be understood that the host 104 and/or nodes 106 may comprise any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, wearable computing devices, metering devices, data collection devices, leak detecting devices, or the like.

As illustrated in FIG. 1, in various examples, each of the host 102 and node 106 are capable of communicating messages via short message service (SMS) 116, which is a first type of communication channel, and also via at least a second type of communications channel 118. In various examples, the second type of communication channel 118 is an IP network, such as a TCP/IP network or a UDP network, among others.

It should be noted in FIG. 1 that the transmission of data within the network 100 may occur in two different directions, from the top down and from the bottom up. For example, utility data collected by the utility device 108 may be transmitted via the node 106 to the host 104 associated with the utility provider. As another example, the host 104 may transmit data such as firmware upgrades to the node 106.

Figure 2:
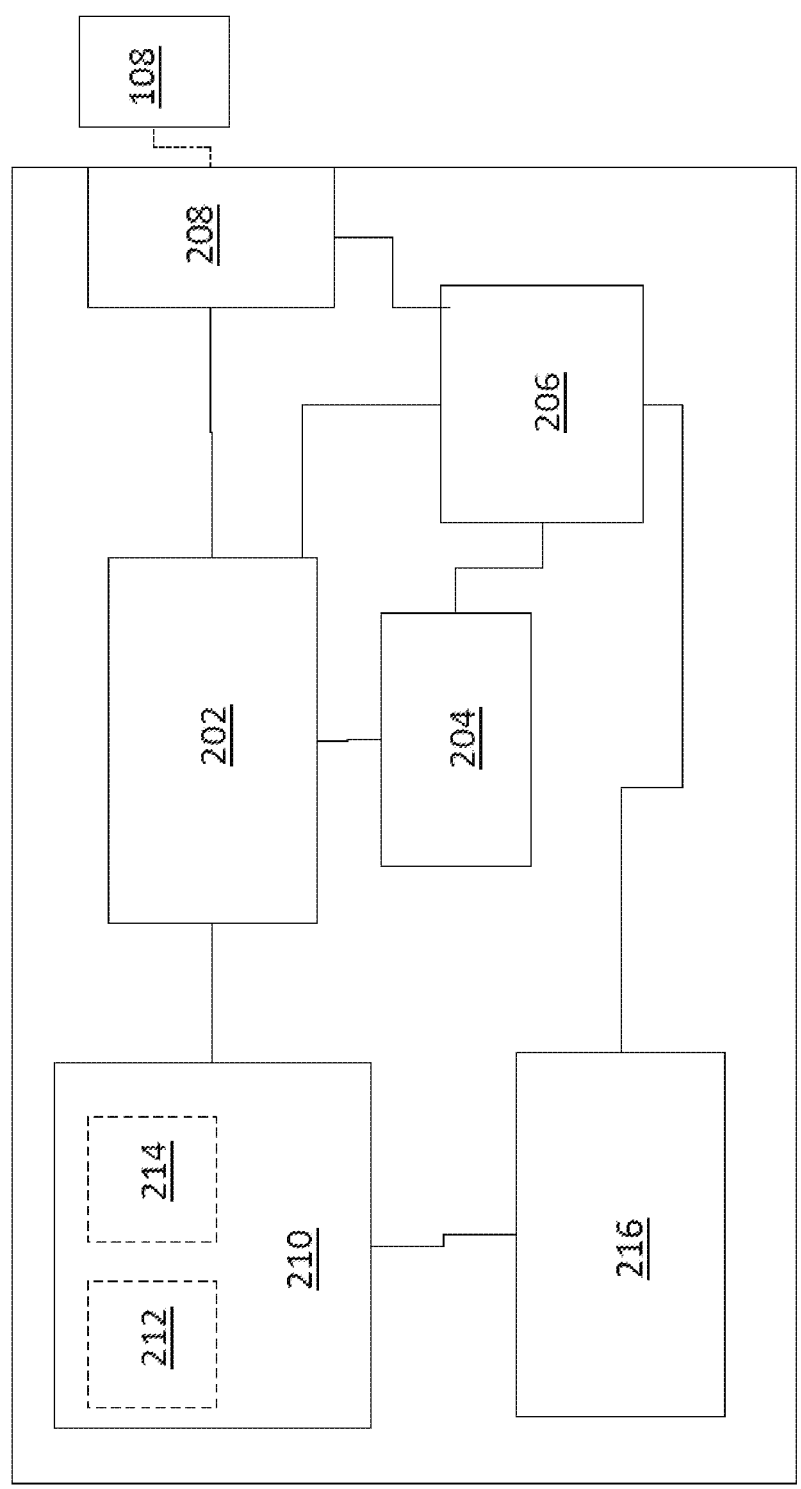
FIG. 2 is a block diagram illustrating a node of the communications network according to various implementations of the current disclosure.

FIG. 2 is a block diagram illustrating an example of a node 106. In this example, the node 106 includes a processor 202. The processor 202 is coupled to at least one input port 208 for receiving utility data from the utility device 108. The utility data may include data related to a utility, such as water, electricity, gas, etc. The utility data may also include various types of information such utility consumption data, reading data, status data, unauthorized use of the commodity, authorized use of the commodity, alerts such as backflow alerts or leak alerts, GPS location, proximity, temperature, corrosion, fluid flow, pressure, water quality, air quality, or various other data related to the utility.

The processor 202 is coupled to a data storage unit 204. The data storage unit 204 may hold a predetermined amount of data received from the utility device 108. For example, the data storage unit 204 can hold a predetermined number of utility usage readings (e.g. 10 readings, 100 readings, 1000 readings, etc.), can hold data for a predetermined amount of time (e.g. one hour, one day, one week, one month, etc.), or can hold data until directed by the host 104 to transmit the data. In addition, the data storage unit 204 may hold instructions for the processor 202 to execute upon prompting by the host 104. In various examples, the processor 202 compiles at least some of the data stored in the data storage unit 204 for transmitting to the host 104 associated with the utility provider.

The processor 202 is coupled to a transceiver 216 via a network manager 210. The transceiver 216 is responsible for transmitting and receiving data from the node 106, such as to the host 104, the utility devices 108, or other nodes 106. The network manager 210 comprises computer programs for managing the use of various communication networks by the node 106. In various examples, the network manager 210 may refer simply to the software or collection of computer programs; in various other examples, the network manager 210 may refer to both the collection of computer programs and the devices and circuitry configured to execute those computer programs, such as a microcontroller and/or a programmable, digital radio. The network manager 210 includes an SMS routine 212, which is a first communication channel routine, and a second communication channel routine 214. In various examples, the second communication channel routine 214 is a TCP/IP protocol routine. The network manager 210 handles communication channel management and supports messaging processing, routing and link/connection management over SMS 116 or the second type of communication channel 118 by utilizing one of the SMS routine 212 or the second communication channel routine 214. In various examples, the network manager 210 may include additional communication channel routines to support messaging processing, routing, and link/connection management over additional communication channels.

As illustrated in FIG. 2, the node 106 may include a power source 206. The power source 206 is a device capable of powering the processor 202 and devices attached to the processor 202, such as the transceiver 216, the data storage unit 204, and the input port 208. The power source 206 can be a battery, solar panel array, wind turbine, water turbine, electrical lines, or any other suitable source of power for the node 106. In various examples, the node 106 also includes a backup power source, such as a battery. In various examples, the power may derive from the operation of the infrastructure system.

In various examples, the node 106 may collect data and/or transmit data continuously, at specific time intervals, or randomly. In examples where the node 106 collects and transmits data in a non-continuous configuration, the node 106 may turn off or reduce power consumption to save energy. The node 106 may communicate data via SMS 116 until a connection over the second type of communication channel 118 is needed. In various examples, communicating data via SMS 116 requires less energy to establish the connection compared to communicating data over the second type of communication channel 118. For example, when the second type of communication channel 118 is a TCP/IP connection, the node 106 communicating data via SMS 116 establishes a cellular network connection and sends SMS messages asynchronously whereas the node 106 communicating data via TCP/IP connections must first establish a connection to a WWAN, such as a cellular network, then establish an IP connection on the WWAN, and then implement a communication to the host 104 via the TCP/IP. In this manner, communicating data via SMS 116 until a connection over the second type of communication channel 118 is needed may provide improved battery life of the node 106, thereby reducing the amount of maintenance needed for nodes 106. Additionally, because less energy is needed to communicate via SMS 116 compared to the second type of communication channel 118, the network 100 may establish more connections via SMS 116 within a given time period compared to connections via the second type of communication channel 118 for the same amount of energy, thereby providing for a more responsive network 100.

Figure 3:
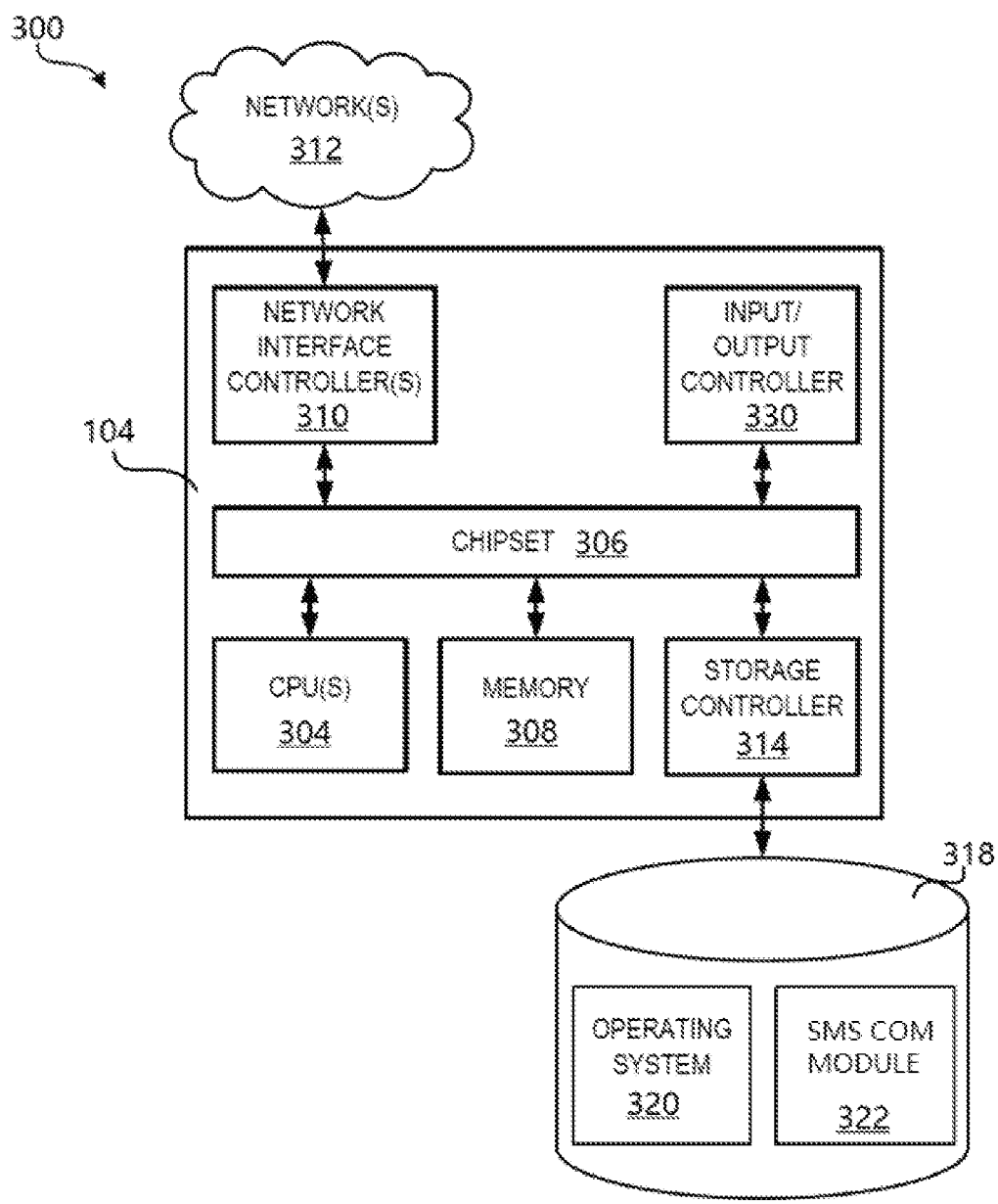
FIG. 3 is a block diagram of an example of a computer architecture of a host of the communications network according to various implementations of the current disclosure.

FIG. 3 is a block diagram illustrating an example computer architecture 300 of a host 104, which is a computing device such as a conventional server computer, workstation, desktop computer, laptop, or other computing device, and may be utilized receive and transmit various information to the node 106. The host 104 includes a baseboard, or "motherboard," which is a printed circuit board to which a multitude of components or devices may be connected by way of a system bus or other electrical communication paths. In one illustrative embodiment, one or more central processing units ("CPUs") 304 operate in conjunction with a chipset 306. The CPUs 304 are standard programmable processors that perform arithmetic and logical operations necessary for the operation of the host 104.

The CPUs 304 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 306 provides an interface between the CPUs 304 and the remainder of the components and devices on the baseboard. The chipset 306 may provide an interface to a memory 308. The memory 308 may include a random access memory ("RAM") used as the main memory in the host 104. The memory 308 may further include a computer-readable storage medium such as a read-only memory ("ROM") or non-volatile RAM ("NVRAM") for storing basic routines that that help to startup the host 104 and to transfer information between the various components and devices. The ROM or NVRAM may also store other software components necessary for the operation of the host 104 in accordance with the embodiments described herein.

According to various embodiments, the host 104 may operate in a networked environment using logical connections to remote computing devices, such as the node 106, through one or more networks 312, such as the wireless mesh network described herein, a local-area network ("LAN"), a WWAN, the Internet, an Ethernet, or any other networking topology known in the art that connects the host 104 to the devices and other remote computers. The chipset 306 includes functionality for providing network connectivity through one or more network interface controllers ("NICs") 310, such as a gigabit Ethernet adapter. For example, the NIC 310 may be capable of connecting the host 104 to the nodes 106 in the communication network 100 as well as other computer devices in the utility provider's systems via SMS 116 and the second type of communication channel 118. It should be appreciated that any number of NICs 310 may be present in the host 104, connecting the computer to other types of networks and remote computer systems beyond those described herein.

The host 104 may be connected to a mass storage device 318 that provides non-volatile storage for the computer. The mass storage device 318 may store system programs, application programs, other program modules, and data, which are described in greater detail herein. The mass storage device 318 may be connected to the host 104 through a storage controller 314 connected to the chipset 306. The mass storage device 318 may consist of one or more physical storage units. The storage controller 314 may interface with the physical storage units through a serial attached SCSI ("SAS") interface ("SCSI" standing for "small computer system interface"), a serial advanced technology attachment ("SATA") interface, a fiber channel ("FC") interface, or other standard interface for physically connecting and transferring data between computers and physical storage devices.

The host 104 may store data on the mass storage device 318 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 318 is characterized as primary or secondary storage, or the like. For example, the host 104 may store information to the mass storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The host 104 may further read information from the mass storage device 318 by detecting the physical states or characteristics of one or more particular locations within the physical storage units.

The mass storage device 318 may store an operating system 320 utilized to control the operation of the host 104. According to some embodiments, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 318 may store other system or application programs and data utilized by the host 104, such as an SMS communication module 322 utilized by the computer to perform the SMS communication functions described herein as executing on the host 106 or other computer system.

In some embodiments, the mass storage device 318 may be encoded with computer-executable instructions that, when loaded into the host 104, may transform the computer from a general-purpose computing system into a special-purpose computer capable of implementing the embodiments described herein. These computer-executable instructions transform the host 104 by specifying how the CPUs 304 transition between states, as described above. In further embodiments, the host 104 may have access to other computer-readable storage medium in addition to or as an alternative to the mass storage device 318.

The host 104 may also include an input/output controller 330 for receiving and processing input from a number of input devices, such as a keyboard, a mouse, a touchpad, a touch screen, an electronic stylus, or other type of input device. Similarly, the input/output controller 330 may provide output to a display device, such as a computer monitor, a touchscreen, a flat-panel display, a digital projector, a printer, a plotter, or other type of output device. The display may display data in the form of text, images, and other appropriate graphical content. It will be appreciated that the host 104 may not include all of the components shown in FIG. 3, and the host 104 may include other components that are not explicitly shown in FIG. 3, or may utilize an architecture completely different than that shown in FIG. 3. The host 104 may further comprise a network interface to enable the host 104 to communicate via channels 116, 118 (FIG. 1) with the node 106, with additional nodes, with other computing systems, and/or with other suitable devices. The host 104 may further implement a web server and a corresponding web application that allows multiple users to visualize the utility data and configure the system remotely, over the network 100. The host 104 may also comprise any suitable input and/or output device, such as a mouse, keyboard, printer, external disk drive, touchscreen, microphone, or the like. The host 104 may also comprise an antenna (not shown) to wirelessly transmit and/or receive signals, commands, and/or data to and from other devices, including the node(s) 106.

Figure 4:
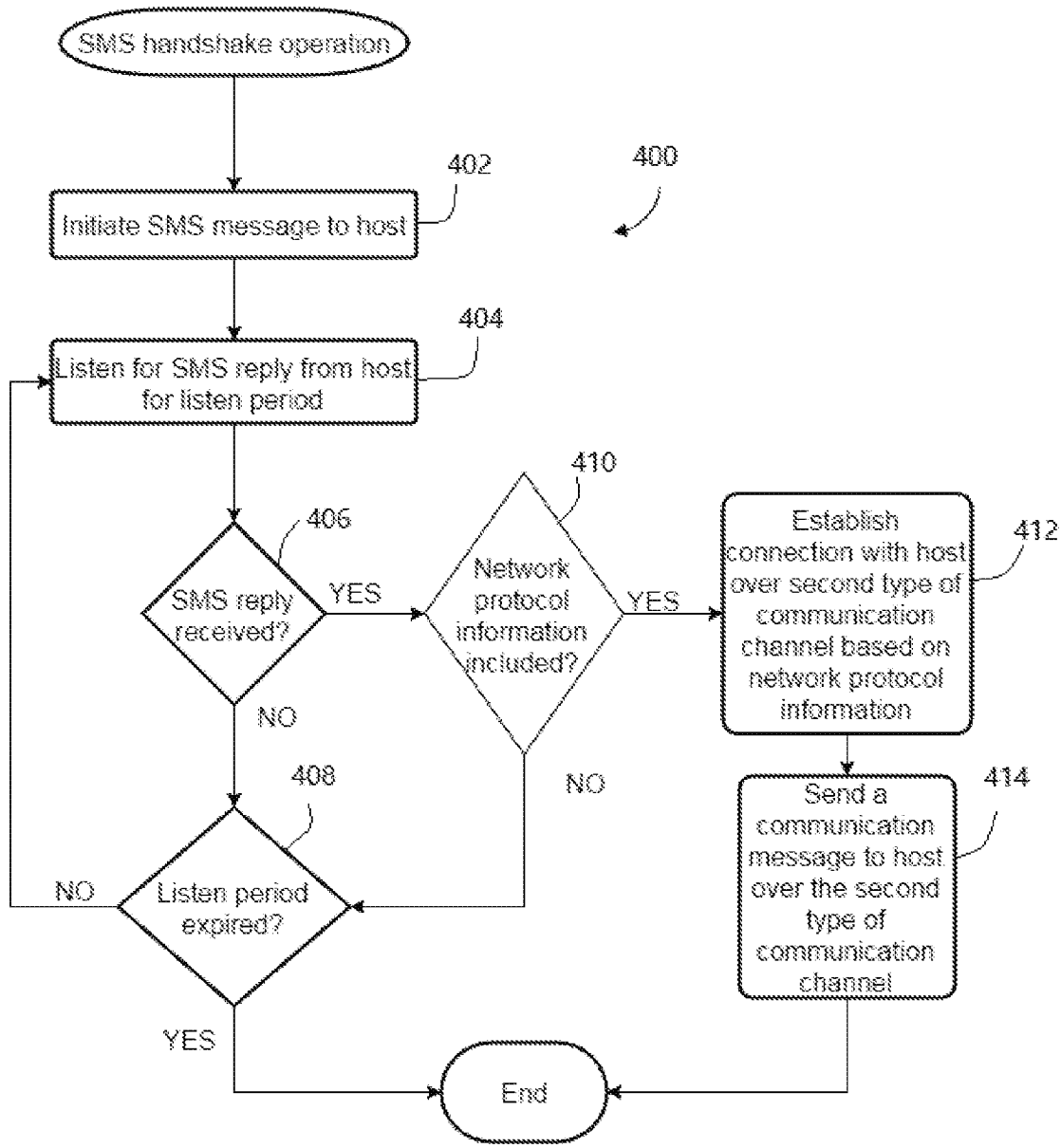
FIG. 4 is a flowchart illustrating an example of a procedure of communicating between a host and a node of a utility infrastructure system according to various implementations of the current disclosure.

FIG. 4 is a flowchart illustrating an example of a procedure of communicating between a node 106 and the host 104 via an SMS handshake operation 400. In various examples, the operation 400 is a set of instructions stored on a tangible, non-transitory computer readable medium, such as the data storage unit 204, that when executed by a processing element, such as the processor 202, cause the processing element to perform and/or control operations of the SMS handshake operation 400.

As described above, in various examples, the host 104 may be configured to aggregate and collect utility data. The node 106 may be a remote, battery-powered node 106 connected to a utility device 108, such as the water meter M (shown in FIG. 1), which detects the utility data at a location within the utility infrastructure system. For example, where the utility device 108 is a water meter and the utility infrastructure system is a water infrastructure system, the data related to utility data may include water consumption data, alert data, and various other types of data related to the water infrastructure system.

The operation 400 includes the node 106 initiating an SMS message to the host 104 in step 402 over SMS 116, which is the first type of communication channel. As part of step 402, the operation 400 comprises establishing a cellular network connection for SMS messaging by the node 106. In various examples, the SMS message comprises the utility data measured by the utility device 108. In various other examples, the SMS message comprises other information for the host 104 from the node 106. For example, in various examples, the SMS message may be a hailing SMS message from the node 106 requesting network protocol information for establishing a connection with the host 104 over the second type of communication channel 118. In various examples, the operation 400 includes receiving, by the node 106, the utility data from the utility device 108 before initiating the SMS message to the host 104.

In various examples, responsive to receiving the SMS message from the node 106, the host 104 may send an SMS reply message via SMS 116. In step 404 of the operation 400, the node 106 starts a listen period during which the node 106 listens for an SMS reply over SMS 116. The listen period is a predetermined amount of time that the node 106 is configured to listen for an SMS message from the host 104.

In step 406 of the operation 400, the node 106 determines whether an SMS reply message from the host 104 has been received. Responsive to determining that no SMS reply message was received, in step 408, the node 106 determines whether the listen period has expired. Responsive to determining that the listen period has not expired, the operation 400 returns to step 404 and continues listening for the SMS reply. Responsive to determining that no SMS reply message was received and the listen period has expired, the operation 400 ends. If the node 106 determines that the SMS reply message from the host 104 was received in step 406, the node 106 determines whether the SMS reply message includes network protocol information for communicating with the host 104 via the second type of communication channel 118. The SMS reply message from the host 104 may include the network protocol information, such as an IP address for establishing an IP connection to an IP network, or various information other than network protocol information. For example, the SMS reply message may comprise a confirmation of having received the SMS message in various examples. The SMS reply message may comprise a "to do" list of tasks for the node 106 to perform such as performing an instant (on demand) read of the utility device 108 in various examples. The SMS reply message may comprise node communication information such as a time to send data to the host 104, a time to read the utility data at the utility device 108, a time to turn an output device associated with the utility device 108 on or off, and various other types of information in various examples.

Responsive to determining by the node 106 that the SMS reply message does not include the network protocol information, the operation 400 proceeds to step 408. Responsive to determining by the node 106 that the SMS reply message includes the network protocol information, in step 412 of the operation 400, the node 106 establishes a connection with the host 104 over the second type of communication channel 118 based on the network protocol information. In step 414 of the operation 400, the node 106 sends a communication message to the host 104 over the second type of communication channel 118 and the node 106 and host 104 may communicate and transmit data over the second type of communication channel 118. For example, the host 104 may transmit firmware updates to the node 106, may perform service or maintenance on the node 106, may perform diagnostics on the node 106, or may transmit various other types of data over the second type of communication channel 118. After communication over the second type of communication channel 118 has ended, the operation 400 ends.

Figure 5:
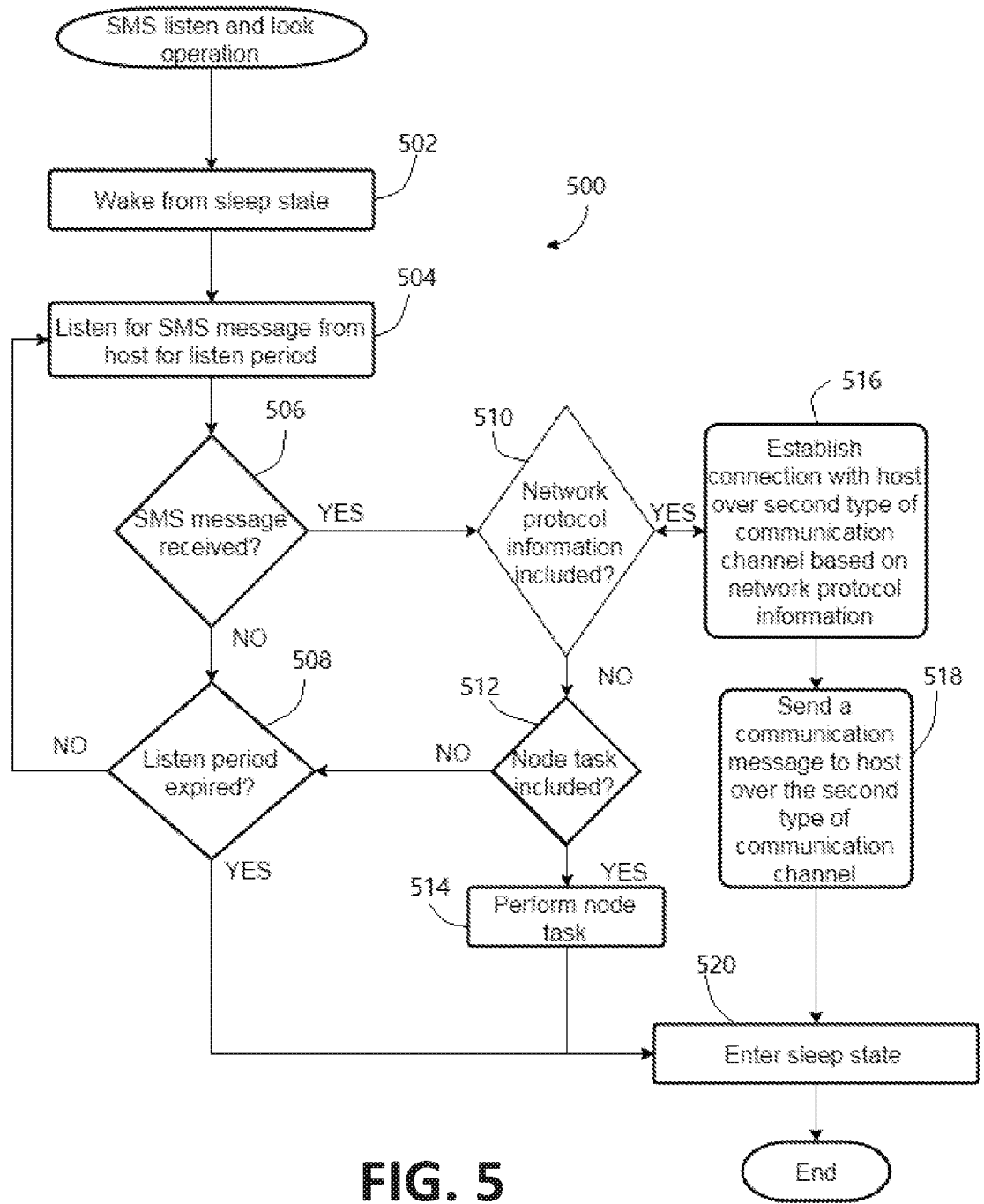
FIG. 5 is a flowchart illustrating another example of a procedure of communicating between a host and a node of a utility infrastructure system according to various implementations of the current disclosure.

FIG. 5 is a flowchart illustrating another example of a procedure of communicating between the host 104 and a node 106 of a utility infrastructure system through an SMS listen and look operation 500. In various examples, the operation 500 is a set of instructions stored on a tangible non-transitory computer readable medium, such as the data storage unit 204, that when executed by a processing element, such as the processor 202, cause the processing element to perform and/or control operations of the SMS listen and look operation 500.

In various examples, the node 106 is configured to power off or otherwise enter a sleep state/low power state when the node 106 is not establishing a connection with the host via SMS 116 or the second type of communication channel 118. In various examples, the node 106 is configured to be in the sleep state or powered off state when the node 106 is not in a listen period.

In step 502 of the operation 500, the node 106 wakes from the sleep state. As part of step 502, the operation 500 comprises establishing a cellular network connection for SMS messaging by the node 106. In step 504 of the operation 500, the node 106 starts to listen for an SMS message from the host 104. In various examples, the node 106 starts a listen period during which the node 106 listens for the SMS message from the host, which may be similar to the listen period described above with reference to the operation 400. In step 506 of the operation 500, the node 106 determines whether an SMS message from the host 104 has been received by the node 106. Responsive to determining by the node 106 that an SMS message was not received, in step 508, the node 106 determines whether the listen period has expired. Responsive to determining that the listen period has not expired, the operation 500 returns to step 504. Responsive to determining that the listen period has expired, the node 106 enters a sleep state in step 520, and the operation 500 ends.

Responsive to determining in step 506 that an SMS message was received, in step 510, the node 106 determines whether the SMS message includes network protocol information. If the node 106 determines that the SMS message does not include network protocol information, the node 106 may determine whether the SMS message includes node task information including, but not limited to, node communication configuration information and the "to do" list of activities to perform. In various other examples, the SMS message may include various other types of information. For example, the SMS message may be a hailing SMS message from the host 104 requesting a reply SMS message from the node 106. In these examples, the node 106 may send the reply SMS message to the node 106 over the SMS 116.

Responsive to determining that the node task information is not included in the SMS message, the operation 500 returns to step 508. Responsive to determining that the SMS message includes the node task information, the node 106 may perform the node task in step 514 and then proceed to enter a sleep state in step 520 before the operation 500 ends.

Responsive to determining in step 510 that the SMS message includes the network protocol information, such as an IP address for a TCP/IP connection, in step 516 of the operation 500, the node 106 establishes a connection with the host 104 over the second type of communication channel 118 based on the network protocol information. In some embodiments, establishing the connection with the host 104 over the second type of communication channel 118 in step 516 comprises establishing a cellular data network connection and then establishing a TCP/IP connection with the host 104 over the cellular data network. In step 518 of the operation 500, the node 106 sends a communication message to the host 104 over the second type of communication channel 118 and the node 106 and host 104 may communicate and transmit data over the second type of communication channel 118. After communication over the second type of communication channel 118 has ended, the node 106 enters the sleep state in step 520 and the operation 500 ends.

One should note that conditional language, such as, among others, "can," "could," "might," or "may," unless specifically stated otherwise, or otherwise understood within the context as used, is generally intended to convey that certain examples include, while other examples do not include, certain features, elements and/or steps. Thus, such conditional language is not generally intended to imply that features, elements and/or steps are in any way required for one or more particular examples or that one or more particular examples necessarily include logic for deciding, with or without user input or prompting, whether these features, elements and/or steps are included or are to be performed in any particular example.

It should be emphasized that the above-described examples are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described example(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A point-to-point communication system for a utility infrastructure system comprising:
    a host configured to aggregate and collect utility data; and
    a plurality of battery-powered nodes in communication with the host, each node in the plurality of battery-powered nodes connected to a utility device of the utility infrastructure system, each node configured to:
        initiate a first communication message to the host via a short message service (SMS), wherein the first communication message includes the utility data,
        receive a SMS reply from the host,
        determine whether the SMS reply from the host includes an internet protocol (IP) address for communicating with the host over an IP network, and
        responsive to determining that the SMS reply from the host includes the IP address, establish a connection with the host over the IP network utilizing the IP address;
    wherein, prior to communication with the host, the plurality of battery-powered nodes requires no preconfiguration with network and security credentials.

2. The point-to-point communication system of claim 1, wherein the utility device is a water meter, wherein data related to utility data comprises one of utility consumption data and alert data, and wherein the utility infrastructure system is a water infrastructure system.

3. The point-to-point communication system of claim 1, wherein each node in the plurality of battery-powered nodes is further configured to listen for the SMS reply during a listening period.

4. The point-to-point communication system of claim 3, wherein each node in the plurality of battery-powered nodes is configured to enter a sleep state when not in a listening period.

5. The point-to-point communication system of claim 3, wherein the listening period is one of a plurality of listening periods.

6. The point-to-point communication system of claim 1, wherein the IP network comprises one of a Transmission Protocol/IP (TCP/IP) network and a User Datagram Protocol (UDP) network.

7. The point-to-point communication system of claim 1, wherein the SMS reply includes an acknowledgment confirming receipt of the first communication message by the host.

8. The point-to-point communication system of claim 1, wherein the SMS reply further includes information about at least one of a time for at least one node in the plurality of battery-powered nodes to establish a connection with the host over the IP network, a time for the at least one node to read the utility data, and a time to activate an activation device of the utility infrastructure system.

9. A method for communicating utility data point-to-point within a utility infrastructure system, the method comprising:
- initiating, by a node in a plurality of nodes in communication with a host, a first communication message to the host via a short message service (SMS), wherein each node in the plurality of nodes is a battery-powered node of the utility infrastructure system;
- receiving, by the node, a SMS reply from the host;
- determining, by the node, whether the SMS reply from the host includes an internet protocol (IP) address for establishing a connection with the host over an IP network; and
- responsive to a determination by the node that the SMS reply from the host includes the IP address, sending, by the node a second communication message to the host via the IP network based on the IP address in the SMS reply;
- wherein, prior to communication with the host, the plurality of nodes requires no preconfiguration with network and security credentials.

10. The method of claim 9, further comprising:
- waking, by the node, from a sleep state; and
- listening, by the node, for the SMS reply during a listening period.

11. The method of claim 9, further comprising receiving, by the node, utility data from a water meter, wherein the utility infrastructure system is a water infrastructure system, and wherein the first communication message initiated by the node includes the utility data from the water meter.

12. The method of claim 11, wherein the IP network comprises one of a Transmission Protocol/IP (TCP/IP) network and a User Datagram Protocol (UDP) network.

13. The method of claim 9, further comprising:
- listening, by the node, during a listening period for a hailing SMS message from the host over the SMS; and
- receiving, by the node, the hailing SMS message, wherein the initiation, by the node, of the first communication message is based on the receiving of the hailing SMS message.

14. A tangible non-transitory computer readable medium having a set of instructions stored therein that when executed by a processing element cause the processing element to perform and/or control operations comprising:
- listening, by a node in a plurality of nodes in communication with a host, for a first point-to-point communication message from the host via a short message service (SMS), and wherein each node in the plurality of nodes is a battery-powered node of a utility infrastructure system connected to a utility meter that measures utility data;
- receiving, by the node, a SMS reply from the host;
- determining, by the node, whether the SMS reply from the host includes an internet protocol (IP) address for establishing a connection with the host over an IP network; and
- responsive to a determination by the node that the SMS reply from the host includes the IP address, sending, by the node, a second point-to-point communication message to the host via the IP network based on the IP address in the first point-to-point communication message;
- wherein, prior to communication with the host, the plurality of nodes requires no preconfiguration with network and security credentials.

15. The computer readable medium of claim 14, wherein the IP network comprises one of a Transmission Protocol/IP (TCP/IP) network and a User Datagram Protocol (UDP) network.

16. The computer readable medium of claim 14, wherein listening for the first point-to-point communication message comprises waking from a sleep state and listening for the first point-to-point communication message during a listening period.

17. The computer readable medium of claim 14, wherein listening for the first point-to-point communication message comprises initiating, by at least one node in the plurality of nodes, a hailing SMS message to the host over the SMS, wherein the hailing SMS message comprises the utility data.

18. The computer readable medium of claim 14, wherein the utility infrastructure system is a water infrastructure system, and wherein the utility meter is a water meter.

* * * * *